US011235670B2

(12) United States Patent
Yang et al.

(10) Patent No.: US 11,235,670 B2
(45) Date of Patent: Feb. 1, 2022

(54) HIGH VOLTAGE BATTERY UNIT FOR VEHICLE AND UNDERBODY OF VEHICLE

(71) Applicants: Hyundai Motor Company, Seoul (KR); Kia Motors Corporation, Seoul (KR)

(72) Inventors: Young Tae Yang, Gyeonggi-do (KR); Sung Jun Hwang, Gyeonggi-do (KR); Ki Bong Park, Incheon (KR); Kyung Ho Kim, Gyeonggi-do (KR); Ji Ho Choi, Gyeonggi-do (KR); Hyoung Jin Joo, Incheon (KR); Hyo Seop Cha, Seoul (KR); Sang Wan Kim, Busan (KR); Dong Su Yang, Incheon (KR); Se Hoon Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 16/827,604

(22) Filed: Mar. 23, 2020

(65) Prior Publication Data

US 2021/0101490 A1  Apr. 8, 2021

(30) Foreign Application Priority Data

Oct. 4, 2019  (KR) .................... 10-2019-0123264

(51) Int. Cl.
*B60K 1/04*  (2019.01)
*B60L 50/60*  (2019.01)
*H01M 50/20*  (2021.01)

(52) U.S. Cl.
CPC ............ *B60L 50/66* (2019.02); *H01M 50/20* (2021.01); *B60K 2001/0438* (2013.01); *H01M 2220/20* (2013.01)

(58) Field of Classification Search
CPC ........... B60L 50/64; B60L 50/66; B60K 1/04; H01M 50/60
See application file for complete search history.

(56) References Cited

U.S. PATENT DOCUMENTS

| 9,499,205 | B1 | 11/2016 | Elia et al. |
| 9,925,890 | B2* | 3/2018 | Enning .................. B60L 58/26 |
| 2012/0312612 | A1 | 12/2012 | Harrison, III et al. |
| 2013/0248264 | A1 | 9/2013 | Matsuda et al. |
| 2015/0107921 | A1 | 4/2015 | Naruke |

FOREIGN PATENT DOCUMENTS

| DE | 102015000578 A1 | 7/2016 |
| EP | 2199133 A2 | 6/2010 |
| KR | 10-2012-0114638 A | 10/2012 |

* cited by examiner

*Primary Examiner* — James A Shriver, II
*Assistant Examiner* — James J Triggs
(74) *Attorney, Agent, or Firm* — Mintz Levin Cohn Ferris Glovsky and Popeo, P.C.; Peter F. Corless (57) ABSTRACT

A high voltage battery unit for a vehicle and an underbody of the vehicle are provided. The high voltage battery unit mounted to the vehicle is installed under a center floor of the vehicle at the outdoor side. A drive shaft forming a drive device of the vehicle is installed to penetrate between battery built-in parts positioned at both sides with respect to a center tunnel to deliver the power of a powertrain mounted at the front of the vehicle to a rear wheel through the drive shaft.

17 Claims, 10 Drawing Sheets

HIGH VOLTAGE BATTERY UNIT FOR VEHICLE AND UNDERBODY OF VEHICLE

CROSS REFERENCE TO RELATED APPLICATION

The present application claims priority of Korean Patent Application No. 10-2019-0123264 filed on Oct. 4, 2019, the entire contents of which is incorporated herein for all purposes by this reference.

BACKGROUND

Field of the Disclosure

The present disclosure relates to a high voltage battery unit for a vehicle and an underbody of the vehicle, and more particularly, to a high voltage battery unit for a vehicle is installed under a center floor, and a drive shaft of a vehicle to deliver power to a rear wheel via the high voltage battery unit.

Description of the Related Art

A motorized vehicle that operates using an electric motor, such as a hybrid electric vehicle, a fuel cell vehicle, and an electric vehicle is equipped with a high voltage battery unit that provides driving power to the electric motor. The high voltage battery unit includes a high voltage battery installed in an enclosed internal space of a battery case, a Battery Management System (BMS) configured to sense the voltage, current, temperature, and the like of each unit cell forming the high voltage battery and configured to execute an operation thereof, and the like. In general, a method for mounting the high voltage battery unit to the vehicle largely includes a method of mounting the unit in a trunk space, and a mounting the unit to be fixed under the center floor outside the vehicle.

In a structure that mounts the high voltage battery unit in the trunk space, it is difficult to provide a spare tire in the same space since the trunk space is reduced, and in particular, in a Sport Utility Vehicle (SUV) or a Multi Purpose Vehicle (MPV), it is difficult to implement a full flat of a third row seat using a luggage room. In a structure of that mounts the high voltage battery unit under the center floor, it is difficult to deliver the power of a powertrain (engine and motor) mounted to the front of the vehicle to the rear wheel, and therefore, it is necessary to separately mount a rear wheel drive motor to implement All Wheel Drive (AWD), and in particular, it is disadvantageous to the power performance because the size of the rear wheel drive motor may not be increased due to the restriction of the installation space.

The foregoing explained as the background is intended merely to aid in the understanding of the background of the present disclosure, and is not intended to mean that the present disclosure falls within the purview of the related art that is already known to those skilled in the art.

SUMMARY

The present disclosure is a high voltage battery unit for a vehicle and an underbody of the vehicle in which a high voltage battery unit is installed under a center floor, and a drive shaft of a vehicle may deliver power to a rear wheel through the high voltage battery unit. An object of the present disclosure is to provide a high voltage battery unit for a vehicle and an underbody of the vehicle, which may maximize the utilization of a trunk space, thereby being advantageous for merchantability, drive the rear wheel using the power of a powertrain without using a rear wheel drive motor, thereby being advantageous for the cost and the weight, in particular, increasing the rigidity of a vehicle body through the vehicle connection structure of the high voltage battery unit, and therefore, enhancing Ride & Handling (R&H) performance and Noise Vibration Harshness (NVH) performance of the vehicle.

A high voltage battery unit for a vehicle according to the present disclosure for achieving the object may include a battery built-in part coupled to both sides under a center floor of a vehicle, respectively and having a high voltage battery built-in therein; and a connecting portion configured to connect between the battery built-in parts positioned at both sides thereof, to form an installation space in the front and rear direction of the vehicle, and to penetrate a drive shaft of the vehicle between the battery built-in parts of both sides thereof through the installation space.

Further, an underbody of a vehicle according to the present disclosure may include a center floor constituting the lower portion of the vehicle; and a high voltage battery unit having battery built-in parts coupled to both sides under a center floor, respectively and having a high voltage battery built-in therein, and a connecting portion configured to connect between battery built-in parts, to form an installation space in the front and rear direction of the vehicle, and to penetrate a drive shaft of the vehicle between the battery built-in parts of both sides thereof through the installation space.

The underbody of the vehicle may further include a front cross member positioned at the front of the high voltage battery unit, extending in the left and right direction of the vehicle, and coupled to the center floor, and the front cross member may form the load pass by connecting side sills and front cross members positioned at the left and right sides of the vehicle. The underbody of the vehicle may include a rear cross member positioned at the back of the high voltage battery unit, extending in the left and right direction of the vehicle, and coupled to the center floor, and the rear cross member may form the load pass by being connected with side sills positioned at the left and right sides of the vehicle.

Additionally, the underbody of the vehicle may include a front cross member and a rear cross member positioned at the front and the rear of the high voltage battery unit, respectively, extending in the left and right direction of the vehicle, coupled to the center floor, having both end portions connected to side sills positioned at the left and right sides of the vehicle, and connected with the high voltage battery unit. The outer circumference of the high voltage battery unit may be surrounded by side sills of both sides thereof and the front cross member and the rear cross member positioned at the front and the rear thereof.

The connecting portion may be indented along a center tunnel formed on the center floor to form the installation space in the longitudinal direction of the vehicle, and the drive shaft may be positioned in the installation space to be disposed to penetrate between the battery built-in parts of both sides thereof. In addition, the connecting portion may be formed to be open downward while connecting the upper portions of the battery built-in parts positioned at both sides thereof, and a space open downward from the connecting portion may become the installation space in which the drive shaft is positioned. The connecting portion may be formed to be open upward while connecting the lower portion of the battery built-in parts positioned at both sides thereof, and a space that upward from the connecting portion may become the installation space in which the drive shaft is positioned.

The underbody of the vehicle may further include a traverse member coupled to the lower surface of the battery built-in part to extend in the left and right direction, and a first end of the traverse member may be connected to a side sill of the vehicle to form the lateral load pass. The underbody of the vehicle may include a longitudinal member coupled to the lower surface of the battery built-in part to extend in the front and rear direction, and the front end of the longitudinal member may be connected to the front cross member and the rear end of the longitudinal member is connected to the rear cross member to form the forward and backward load pass.

The underbody of the vehicle may further include a traverse member coupled to the lower surface of the battery built-in part to extend in the left and right direction; and a connecting portion reinforcing member indented into the connecting portion and coupled to extend along the installation space. A first end of the traverse member may be connected to a side sill of the vehicle and a second end of the traverse member may be connected to the connecting portion reinforcing member to form the lateral load pass.

The drive shaft may be mounted to at least any one among the front cross member or the rear cross member or the high voltage battery unit. A seat cross member disposed in the left and right direction above the front cross member and the center floor may overlap vertically with the center floor interposed therebetween. The front cross member may be connected to each other through a flange with the center floor interposed therebetween in a state disposed at the front or the rear with respect to the seat cross member in the left and right direction above the center floor.

Side sills positioned at the left and right sides of the vehicle may include the upper surface, the lower surface, and the side surface, and the left and right ends of the center floor may be connected to the side surface of the side sill and thus, the lower surface of the center floor and the side surface of the side sill may form an accommodating space. The upper portion of the battery built-in part may be accommodated in the accommodating space, and the lower portion of the battery built-in part is protruded downward from the side sill. The front cross member and the rear cross member may include two side parts and a connection part for connecting two side parts, respectively. The outside end of the side part may be connected to the side sill to form the lateral load pass. Both ends of the connection part may be formed with a coupled surface to which the drive shaft is coupled, and both sides of the coupled surface may be formed with a bead connected with the side part.

An exemplary embodiment according to the present disclosure is a structure in which the high voltage battery unit mounted to the motorized vehicle may be fixed under the center floor for the vehicle at the outdoor side, and therefore, may maximize the utilization of the trunk space, thereby being advantageous for the merchantability. Further, an exemplary embodiment of the present disclosure is a configuration of penetrating the drive shaft forming the drive device of the vehicle between the battery built-in parts of both sides thereof through the installation space in the structure of installing the high voltage battery unit under the center floor and then deliver the power of the powertrain to the rear wheel, and it is advantageous for the cost, the weight, and the fuel economy by not using the separate rear wheel drive motor.

Further, an exemplar)/embodiment according to the present disclosure is a configuration in which the high voltage battery unit installed under the center floor may be connected with the vehicle body structure such as the side sill, the front side member, and the rear side member through the traverse member and the longitudinal member, and the front cross member and the rear cross member, and therefore, it may be possible to increase the rigidity of the vehicle body, thereby enhancing the R&H performance and NVH performance of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a high voltage battery unit for a vehicle and an underbody of a vehicle according to an exemplary embodiment of the present disclosure will be described with reference to the accompanying drawings. In a motorized vehicle that operates the vehicle using an electric motor, a high voltage battery unit that provides driving power to the electric motor is mounted thereon, and an exemplary embodiment of the present disclosure, as illustrated in FIGS. 1 to 9, includes a high voltage battery unit 100 fixedly installed under a center floor 210 for the vehicle, and a drive shaft 320 forming a drive device 300 of the vehicle may be configured to deliver power to a rear wheel 230 through the high voltage battery unit 100 in the front and rear direction of the vehicle.

The high voltage battery unit 100 may include a battery case 110 having an enclosed internal space, a high voltage battery 120 fixedly installed in the enclosed internal space of the battery case 110, a BMS 130 configured to operate the high voltage battery 120, and in particular, may be divided into battery built-in parts 140 of both sides in which the high voltage battery 120 has been built-in, and a connecting portion 150 for connecting the battery built-in parts 140 of both sides thereof. The high voltage battery unit 100 may be fixed under the center floor 210 of the vehicle at the outdoor side.

The center floor 210 may be formed with a center tunnel 211 that protrudes upward and extends in the front and rear direction of the vehicle, the battery built-in part 140 may be installed to be positioned at the left and right positions of the center tunnel 211, and the connecting portion 150 for connecting the battery built-in part 140 may be installed in the form inserted into the center tunnel 211 in a curved shape to be protrude upward similar to the center tunnel 211.

In other words, the connecting portion 150 has a portion, which protrudes upward while connecting the upper portion of the battery built-in part 140 positioned at both sides with respect to the center tunnel 211, indented along the center tunnel 211, the connecting portion 150 extends along the longitudinal direction of the vehicle while being formed to be open downward to form an installation space 160, and the drive shaft 320 forming the drive device 300 may be positioned in the installation space 160 of the connecting portion 150 that is open downward, to thus install the drive shaft 320 to penetrate between the batter built-in parts 140 of both sides thereof.

The drive device 300 of the vehicle may include a powertrain 310 having an engine and a motor, and a drive shaft 320 that delivers the power of the powertrain 310. The powertrain 310 may be installed to be fixed to a subframe 220 positioned at the front of the vehicle, the drive shaft 320 may have a first end connected with the powertrain 310 and disposed to extend in the front and rear direction of the vehicle, and as the drive shaft 320 is disposed to be positioned in the installation space 160 of the connecting portion 150 of the high voltage battery unit 100, the drive shaft 320 may be installed to penetrate between the battery built-in parts 140 of both sides thereof.

The drive shaft 320 may be connected to be power-deliverable with the rear wheel 230, and as the power generated in the powertrain 310 is delivered to the rear wheel 230 through the drive shaft 320, the rear wheel 230 may be driven by the power of the powertrain 310 mounted to the front of the vehicle. Since the high voltage battery unit 100 is installed to be positioned under the center floor 210, a front cross member 400 and a rear cross member 500 may be installed to be fixed under the center floor 210 at the front position and the rear position of the high voltage battery unit 100, respectively.

Both the front cross member 400 and the rear cross member 500 may extend in the left and right direction of the vehicle and having both ends connected to side sills 240 positioned at the left and right sides of the vehicle, and therefore, may form the load pass toward the side sill 240. Further, the front cross member 400 may be connected with the rear end of a front side member 250 to form the load pass capable of delivering the load to the front side member 250, and the rear cross member 500 may be configured to be connected to the front end of a rear side member 260 to form the load pass capable of delivering the load to the rear side member 260. Since both the front cross member 400 and the rear cross member 500 are connected with vehicle body structures (e.g., the center floor, the side sill, the front side member, and the rear side member), it may be possible to increase the rigidity of the vehicle body, thereby enhancing R&H performance and NVH performance of the vehicle.

The high voltage batter)/unit 100 installed to be positioned under the center floor 210 at the outdoor side of the vehicle may be installed as a structure that is surrounded by the side sills 240 having the outer circumference positioned at both sides thereof and the front cross member 400 and the rear cross member 500 positioned at the front and rear thereof, and therefore, the installation position of the high voltage battery unit 100 may be regulated by the side sills 240 positioned at both sides thereof and the front cross member 400 and the rear cross member 500 positioned at the front and rear thereof. Additionally, the high voltage battery unit 100 may have a structure capable of being sufficiently protected against the impact from the front and rear direction thereof and the left and right direction thereof.

The drive shaft 320 of the drive device 300 installed to penetrate the installation space 160 of the connecting portion 150 may be mounted to at least any one among the front cross member 400 or the rear cross member 500 or the high voltage battery unit 100, and therefore, may have a strong coupling force. A seat cross member 270 may be coupled to be disposed in the left and right direction thereof above the center floor 210, and the front cross member 400 may be disposed to overlap the seat cross member 270 vertically with the center floor 210 therebetween, thereby securing more enhanced durability through the vertical overlap structure between the seat cross member 270 and the front cross member 400, thereby further strengthening the vehicle body strength and the vehicle body rigidity.

As another example, the front cross member 400 may also be a structure that is connected to each other through flanges 271, 401 with the center floor 210 interposed therebetween in a state positioned at the front or the rear with respect to the seat cross member 270. The front cross member 400 and the rear cross member 500 may include two side parts 410, 510, and connection parts 420, 520 for connecting the two side parts 410, 510, respectively. The side parts 410, 510 may have the cross sections formed in a U shape while being formed in a substantially straight-line shape, and the connection parts 420, 520 may have the cross sections formed in a U shape similar to the side parts 410, 510 while being formed in a tunnel shape, which is convex upward.

The connection parts 420, 520 may be installed in the form inserted into the center tunnel 211 of the center floor 210. The outside ends of the side parts 410, 510 may all be connected to the side sill 240 of the vehicle to form the lateral load pass. The inside ends of the side parts 410, 510 may be coupled to overlap both ends of the connection parts 420, 520 to maintain a strong coupling force. Both the side parts 410, 510 and the connection parts 420, 520 may have shapes with cross sections formed in a U shape to be open upward. Since the flanges 411, 421, 511, 521 of the portion that is open upward are in surface contact with the lower surface of the center floor 210, the spaces between the center floor 210 and the side sill 240 and between the side parts 410, 510 and the connection parts 420, 520 may form an enclosed closed space 280, and it may be possible to further strengthen the strength and rigidity of the vehicle body by the enclosed closed space 280.

Coupled surfaces 422, 522 to which the drive shaft 320 is coupled may be formed at both ends of the connection parts 420, 520, and beads 423, 523 connected with the side parts 410, 510 may be formed at both sides of the coupled surfaces 422, 522. The coupled surfaces 422, 522 may be formed in a plane to strengthen the coupling force with the drive shaft 320 but are not limited thereto, and may be formed in a plane of the same shape as the mounted surface of the drive shaft 320 to be coupled in surface contact with each other. Further, the beads 423, 523 formed on the connection parts 420, 520 may be formed to be connected up to the side parts 410, 510 and may further strengthen the rigidity of the coupled portion between the connection parts 420, 520 and the side parts 410, 510 through the beads 423, 523.

First reinforcing brackets 430, 530 may be coupled to the inner surfaces of the side parts 410, 510; and the first reinforcing bracket 430 coupled to the side part 410 of the front cross member 400 may be coupled with the front end of the longitudinal member 700 to be described later and the second reinforcing bracket 530 coupled to the side part 510 of the rear cross member 500 may be coupled with the front end of the longitudinal member 700 to be described later. Since the first reinforcing brackets 430, 530 may be coupled to the coupled portion of the front cross member 400 and the longitudinal member 700 and the coupled portion of the rear cross member 500 and the longitudinal member 700, respectively, it may be possible to further strengthen the rigidity of the coupled portion. Second reinforcing brackets 440, 540 for strengthening the rigidity of the coupled portion may be coupled to the coupled surfaces 422, 522 to which the drive shaft 320 is coupled at the connection parts 420, 520.

The lower portion of the high voltage battery unit 100 installed to be positioned under the center floor 210 at the outdoor side of the vehicle may be supported by a plurality of traverse members 600 and a plurality of longitudinal members 700, and further, the high voltage battery unit 100 may be connected with the vehicle body structure. In other words, in the high voltage battery unit 100, the plurality of traverse members 600 that extend in the left and right direction and are spaced apart from each other in the front and rear direction may be coupled to the lower surface of the battery built-in part 140, the longitudinal member 700 that extends in the front and rear direction may also be coupled to be positioned by one for each battery built-in part 140 on the lower surface of the battery built-in part 140. Further, the high voltage battery unit 100 may include a connecting portion reinforcing member 800 indented in the connecting portion 150 and coupled to extend in the front and rear direction along the installation space 160.

The transverse member 600 may be installed across the longitudinal member 700, and in this case, a first end of the transverse member 600 may be connected to the side sill 240 of the vehicle and a second end of the transverse member 600 may be connected to the connection portion reinforcing member 800 to form the lateral load pass. Further, since the traverse member 600 is connected with the longitudinal member 700, the forward and backward load pass may also be formed.

As another example, the transverse members 600 may be positioned at the left and right sides of the longitudinal members 700, respectively, to become a structure in which first ends of the transverse members 600 may be connected to the left and right sides of the longitudinal members 700, respectively, and second ends of the transverse members 600 that are not connected with the longitudinal members 700 may be connected with the side sill 240 and the connecting portion reinforcing member 800. This structure may reduce the vertical height of the member as a structure of not overlapping the traverse member 600 and the longitudinal member 700 vertically. The side sills 240 positioned at the left and right sides of the vehicle may be configured so that the longitudinal cross section includes an upper surface 241, a lower surface 242, and a side surface 243, and the left and right ends of the center floor 210 are connected to the side surface 243, thereby forming an accommodation space 290 that is open downward by the lower surface of the center floor 210 and the side surface 243 of the side sill 240 under the center floor 210.

Since the battery built-in part 140 of the high voltage battery unit 100 may be installed to be positioned in the accommodation space 290, the upper portion of the battery built-in part 140 may be accommodated in the accommodation space 290, and the lower portion of the battery built-in part 140 may be installed to be protruded downward from the side sill 240. Since the center floor 210 may be lowered downward as close as possible to the ground through the installation structure of the battery built-in unit 140, it may be possible to secure a sufficient indoor space, and further, as most of the upper end of the battery built-in part 140 may be positioned in the accommodation space 290, it may be possible to sufficiently space the interval between the road surface and the battery built-in part 140.

Figure 1:
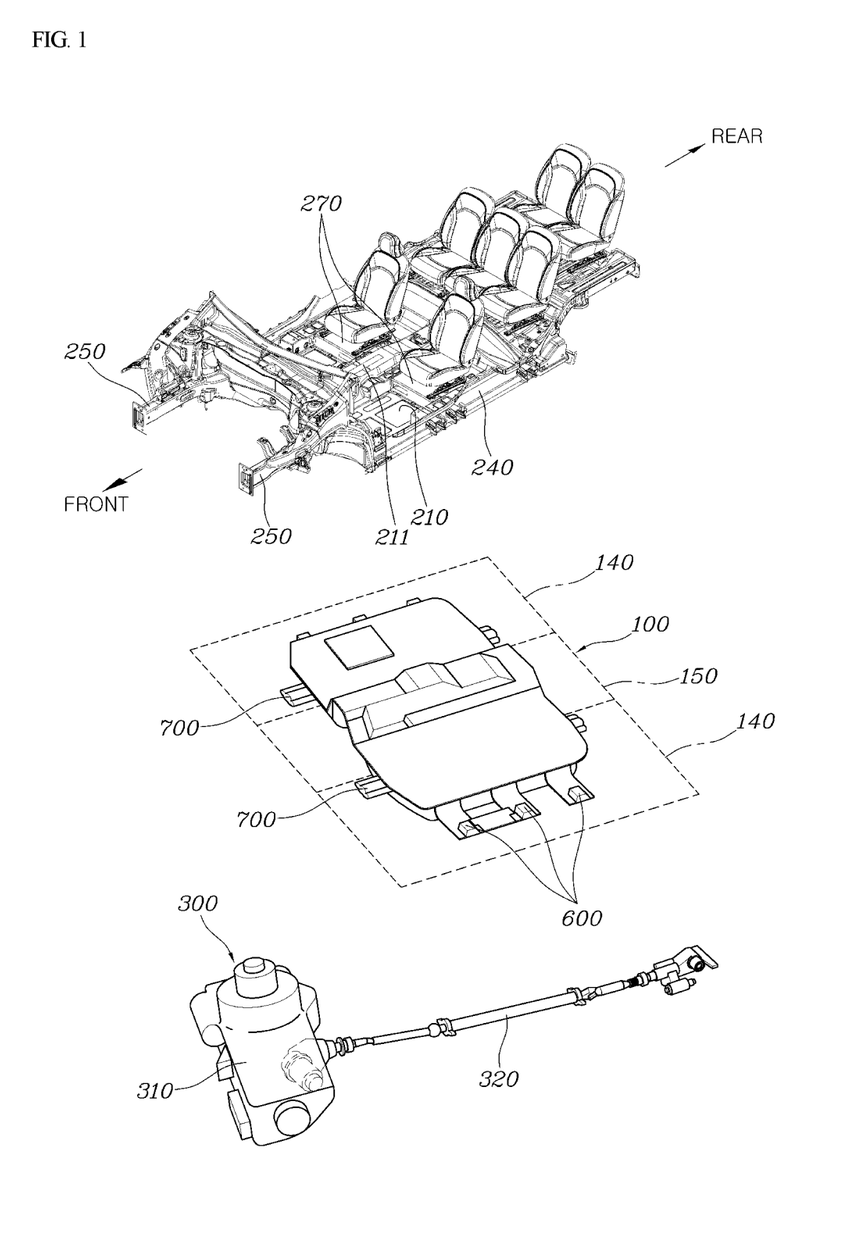
FIG. 1 is an exploded perspective diagram of a high voltage battery unit and a drive device according to an exemplary embodiment of the present disclosure.
Figure 2:
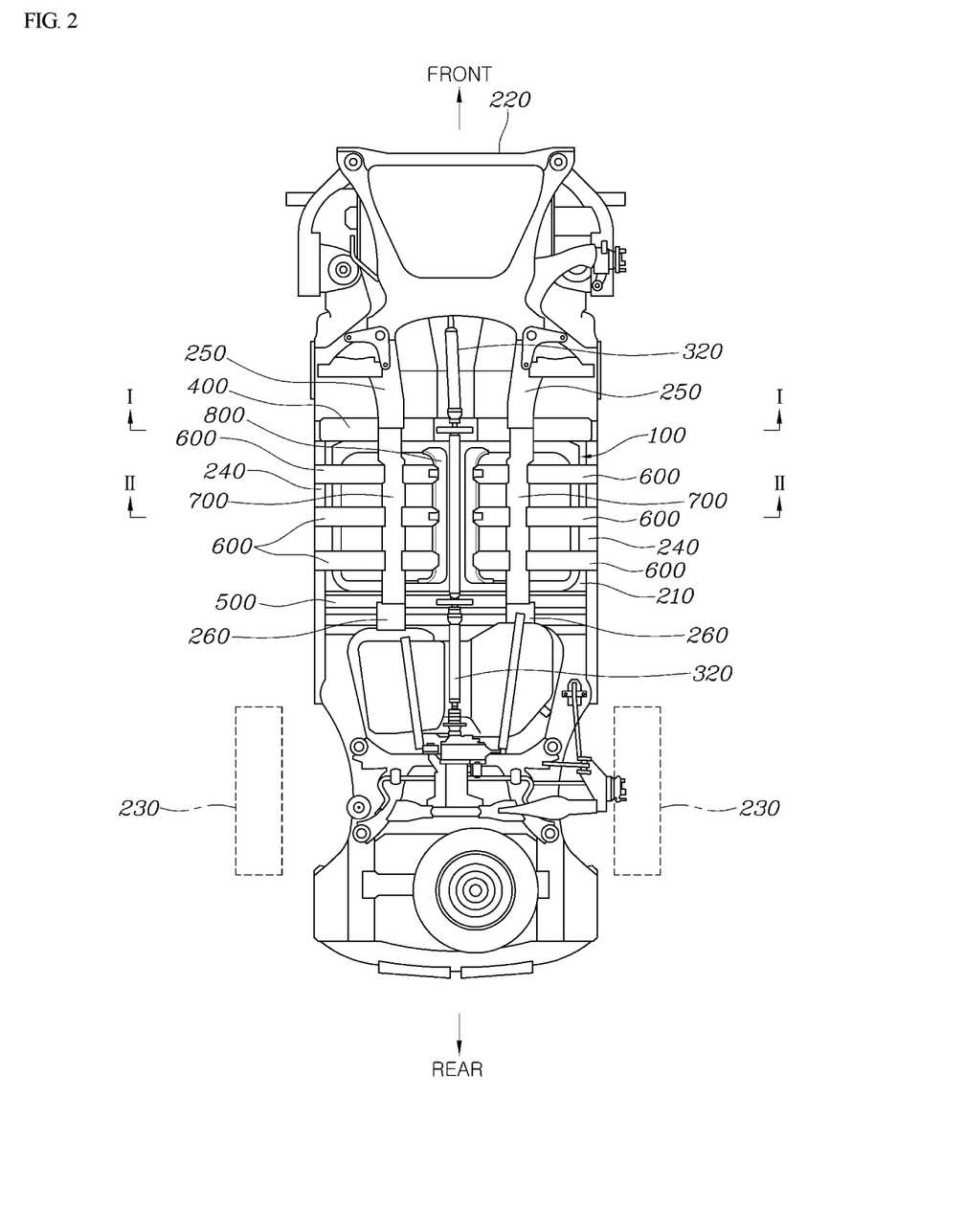
FIGS. 2 and 3 are a bottom diagram and a side diagram of the coupled state of FIG. 1 according to an exemplar)/embodiment of the present disclosure.
Figure 3:
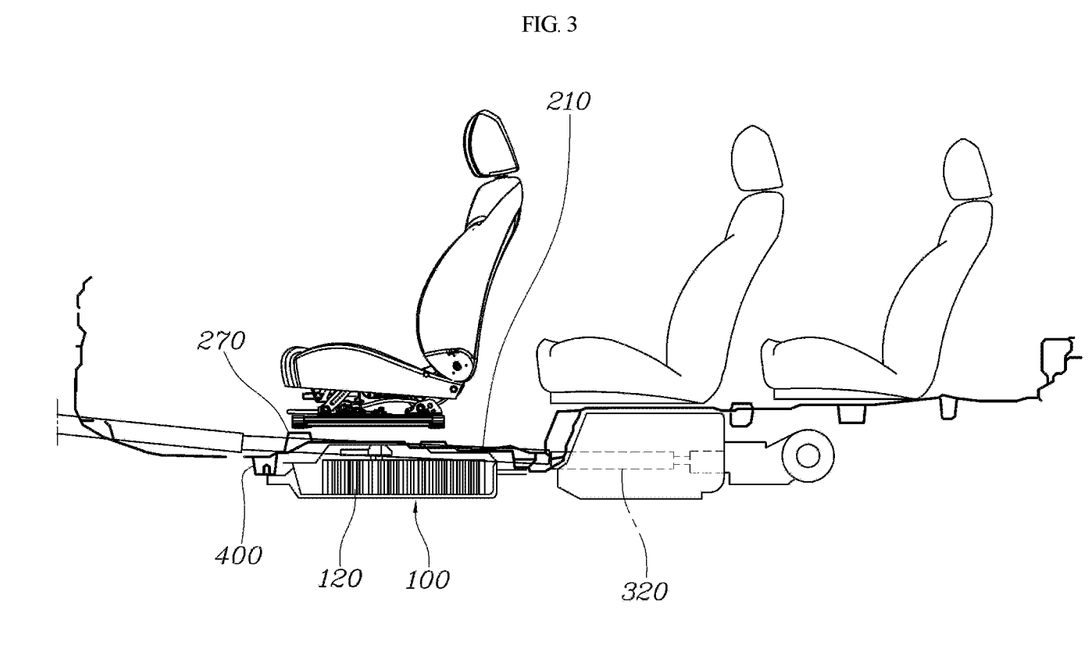
Figure 4:
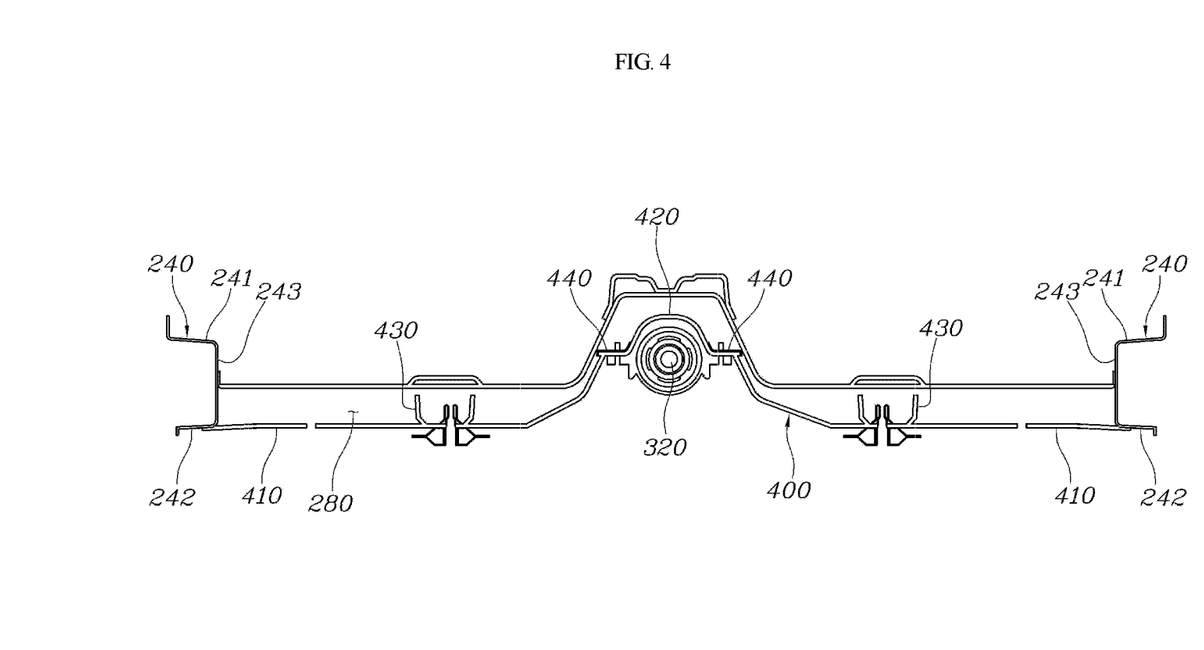
FIGS. 4 and 5 are cross-sectional diagrams taken along the line I-I and the line II-II in FIG. 2 according to an exemplary embodiment of the present disclosure.
Figure 5:
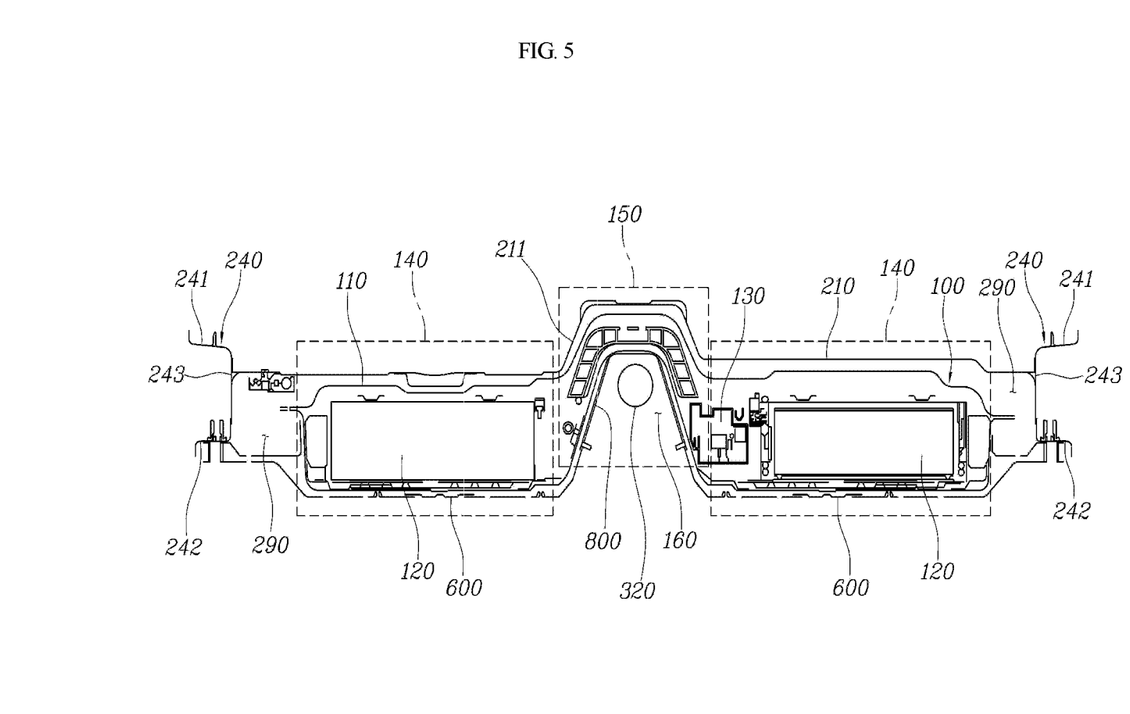
Figure 6:
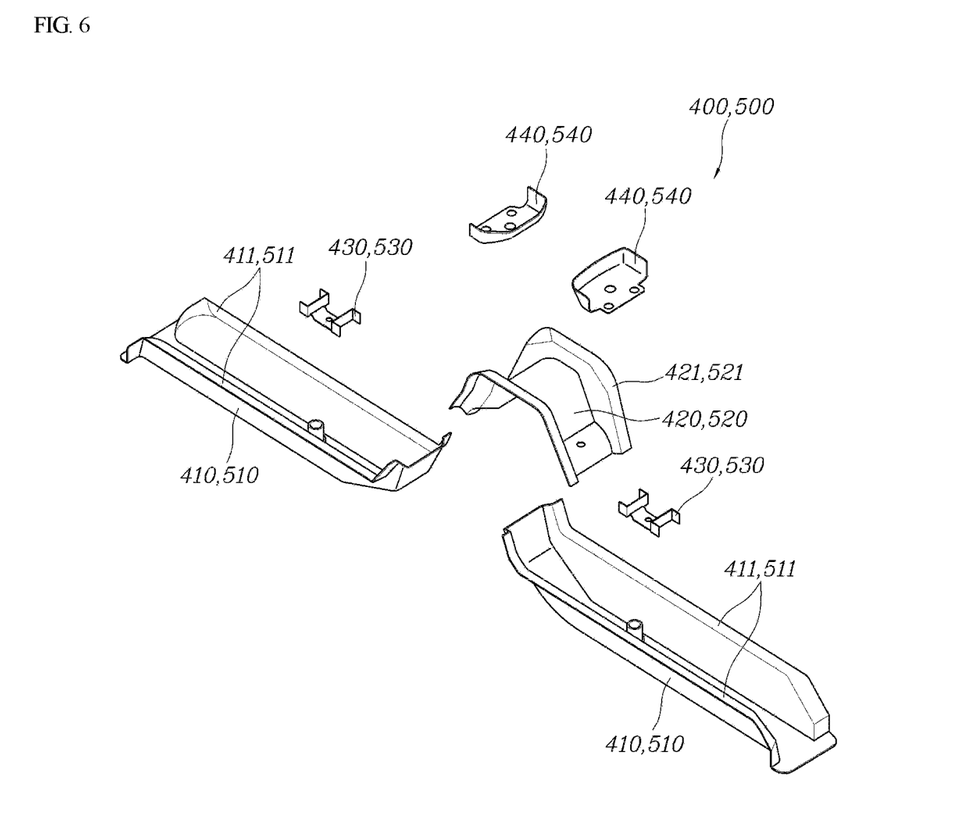
FIG. 6 is an exploded perspective diagram of a front cross member and a rear cross member according to an exemplary embodiment of the present disclosure.
Figure 7:
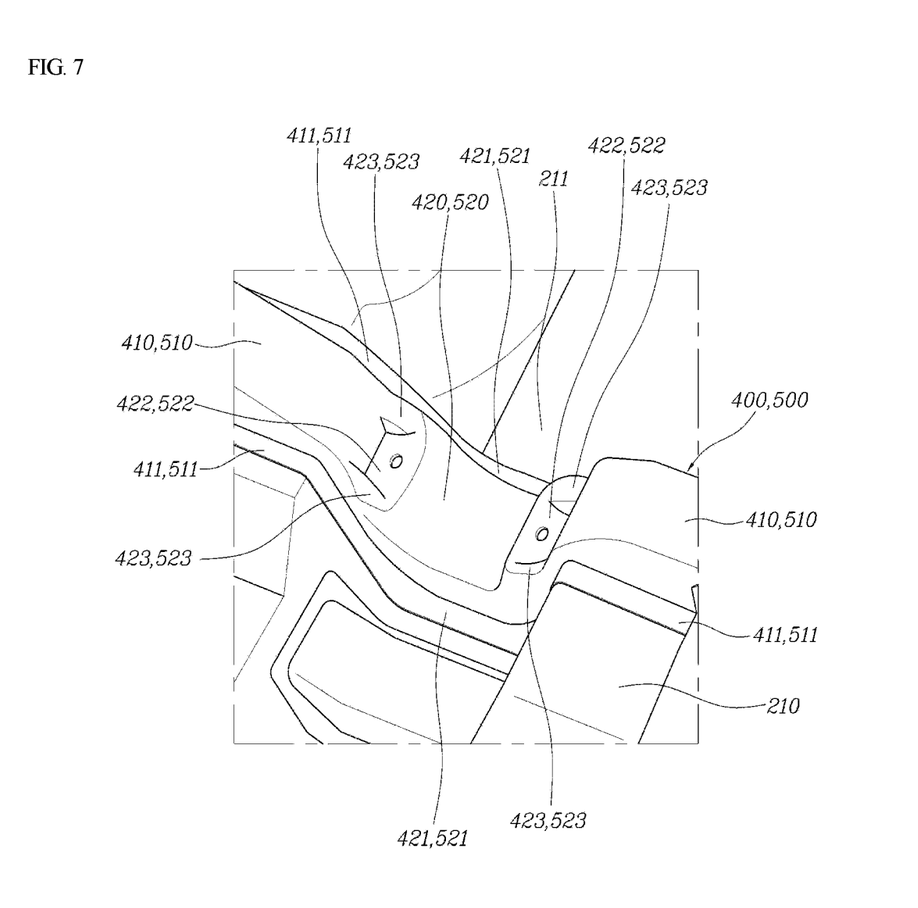
FIG. 7 is a diagram illustration the coupling structure of the connection parts into the center tunnel according to an exemplar)/embodiment of the present disclosure.
Figure 8:
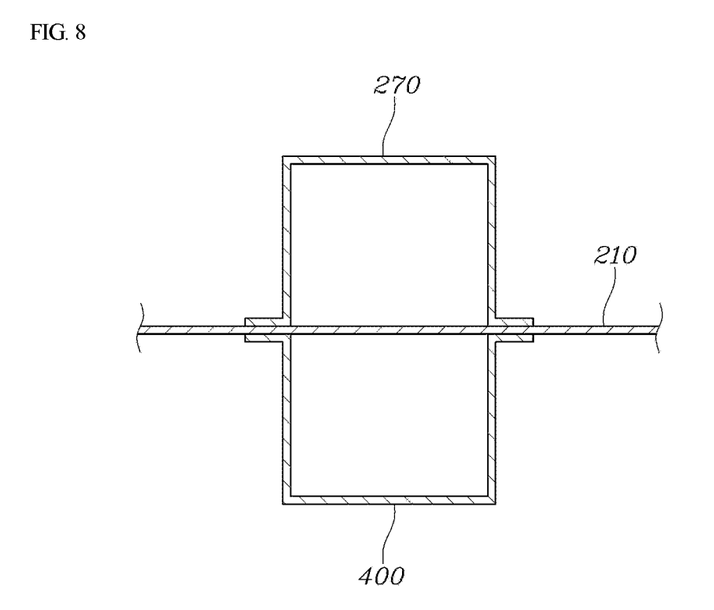
FIGS. 8 and 9 are diagrams illustrating the coupling structure of a front cross member and a seat cross member for each exemplary embodiment of the present disclosure.
Figure 9:
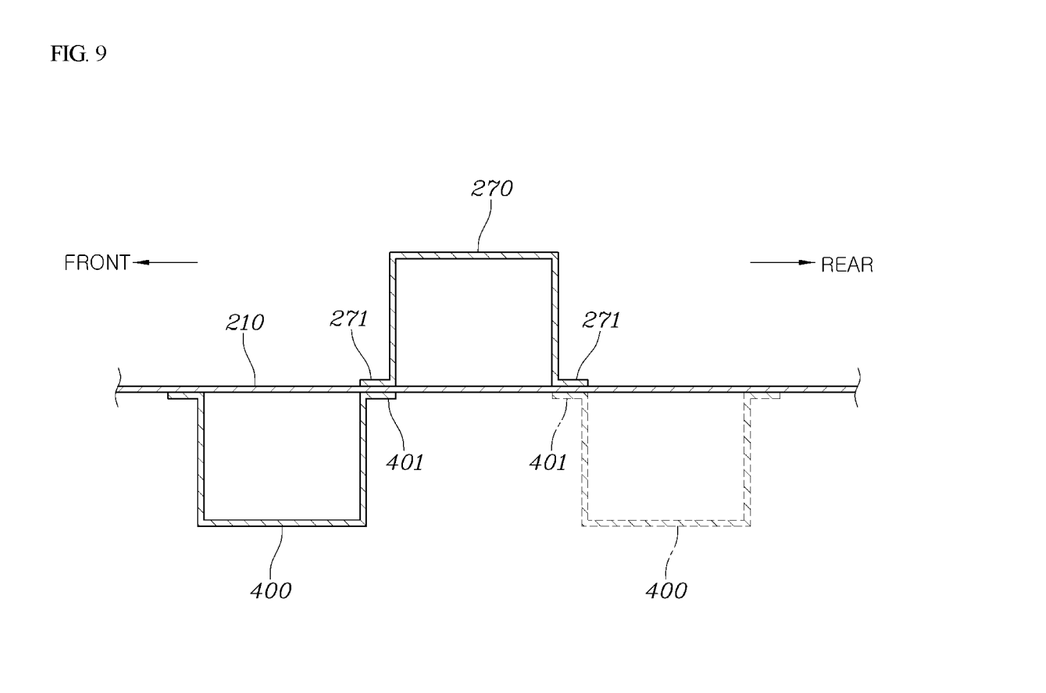
Figure 10:
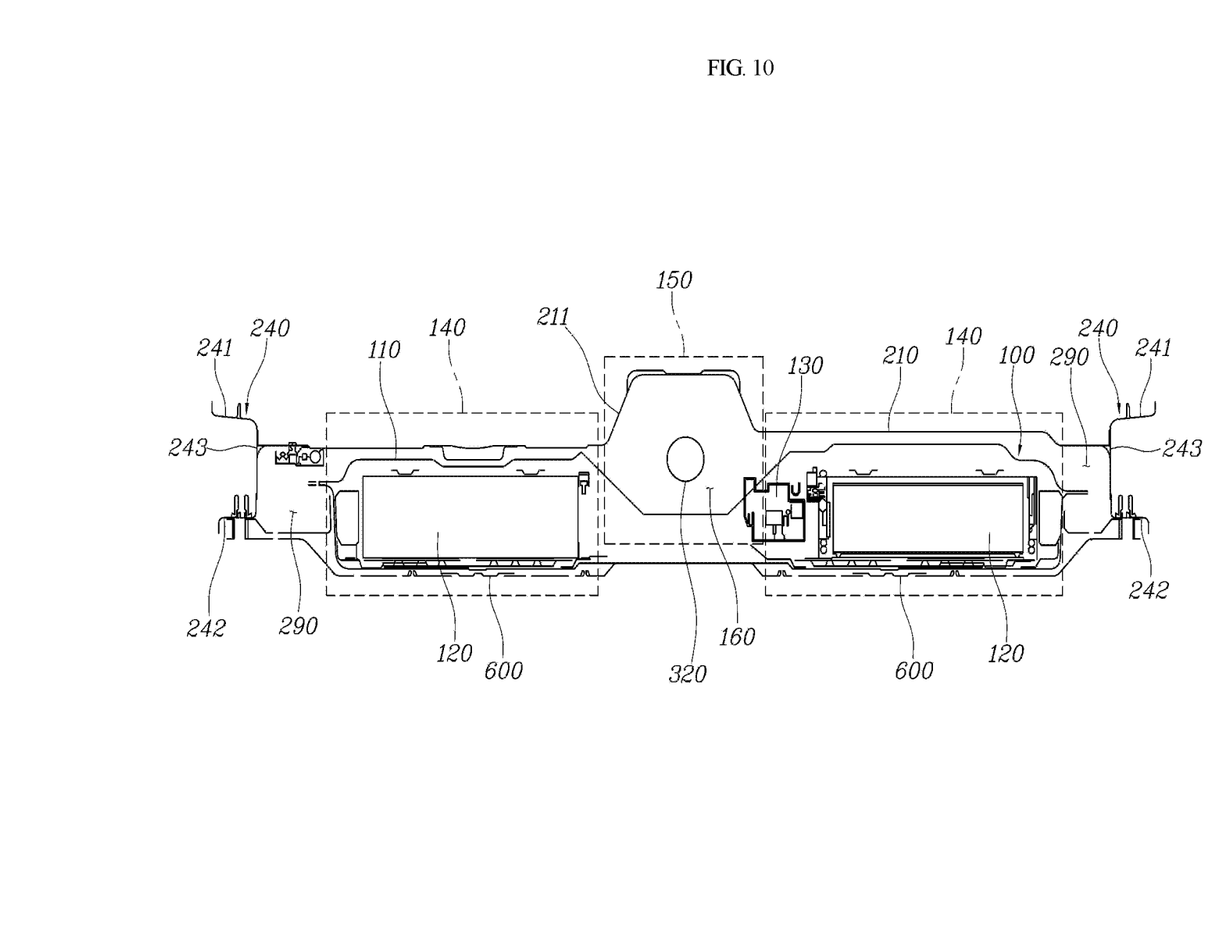
FIG. 10 is a diagram of another exemplary embodiment for the installation space of a connecting portion in which a drive shaft is installed.

Meanwhile, it may also be possible to implement a structure in which the connecting portion 150 of the high voltage battery unit 100 may be formed to be open upward while connecting the lower portion of the battery built-in part 140 positioned at both sides thereof with respect to the center tunnel 211 as in FIG. 10, a space that is open upward and extends along the longitudinal direction of the vehicle becomes the installation space 160, and the drive shaft 320 forming the drive device 300 may be positioned in the installation space 160 of the connecting portion 150 that is open upward to install the drive shaft 320 to penetrate between the battery built-in parts 140 of both sides thereof.

As described above, an exemplary embodiment according to the present disclosure is a structure in which the high voltage battery unit 100 mounted to the motorized vehicle may be installed to be fixed under the center floor 210 of the vehicle at the outdoor side, and therefore, may maximize the utilization of the trunk space, thereby being advantageous for the merchantability. Further, an exemplary embodiment according to the present disclosure is a configuration in which the drive shaft 320 forming the drive device 300 of the vehicle in a structure of installing the high voltage battery unit 100 under the center floor 210 may penetrate between the battery built-in parts 140 of both sides thereof through the installation space 160 of the connecting portion 150 and then deliver the power of the powertrain 310 to the rear wheel 230, and it is advantageous for the cost, the weight, and the fuel economy by not using a separate rear wheel drive motor.

Additionally, an exemplary embodiment according to the present disclosure is a configuration in which the high voltage battery unit 100 installed under the center floor 210 has been connected with the vehicle body structure such as the side sill 240, the front side member 250, and the rear side member 260 through the traverse member 600 and the longitudinal member 700, the front cross member 400 and the rear cross member 500, and the like, and therefore, it may be possible to increase the rigidity of the vehicle body, thereby enhancing Ride & Handling (R&H) performance and Noise Vibration Harshness (NVH) performance of the vehicle.

While it has been illustrated and described with respect to the specific exemplary embodiments of the present disclosure, it will be apparent by those skilled in the art that various improvements and changes of the present disclosure may be made within the technical spirit of the present disclosure as provided by the following claims.

What is claimed is:

1. A high voltage battery unit for a vehicle, comprising:
    a battery built-in part coupled at both sides under a center floor of the vehicle, respectively and having a high voltage battery built-in therein;
    a connecting portion that connects between the battery built-in parts positioned at both sides thereof, to form an installation space in a front and rear direction of the vehicle, and to allow a drive shaft of the vehicle to penetrate between the battery built-in parts of both sides thereof through the installation space; and
    a front cross member positioned at a front of the high voltage battery unit, extending in a left and right direction of the vehicle, and coupled to the center floor,
    wherein the front cross member forms a load path by connecting side sills positioned at left and right sides of the vehicle.

2. An underbody of a vehicle, comprising:
    a center floor forming a lower portion of a vehicle;
    a high voltage battery unit including battery built-in parts coupled at both sides under the center floor, respectively and having a high voltage battery built-in therein, and a connecting portion configured to connect between the battery built-in parts, to form an installation space in a front and rear direction of the vehicle, and to allow a drive shaft of the vehicle to penetrate between the battery built-in parts of both sides thereof through the installation space; and
    a front cross member positioned at a front of the high voltage battery unit, extending in a left and right direction of the vehicle, and coupled to the center floor,
    wherein the front cross member forms a load path by connecting side sills positioned at left and right sides of the vehicle.

3. The underbody of the vehicle according to claim 2, wherein the front cross member forms an additional load path by connecting front side members.

4. The underbody of the vehicle according to claim 2, further comprising:
    a rear cross member positioned at a back of the high voltage battery unit, extending in the left and right direction of the vehicle, and coupled to the center floor,
    wherein the rear cross member further forms the load path by being connected with the side sills positioned at the left and right sides of the vehicle.

5. The underbody of the vehicle according to claim 2, wherein the outer circumference of the high voltage battery unit is surrounded by the side sills of both sides thereof and the front cross member and a rear cross member positioned at the front and the rear thereof, and
    wherein the rear cross member is positioned at a back of the high voltage battery unit, extending in the left and right direction of the vehicle, and coupled to the center floor.

6. The underbody of the vehicle according to claim 2, wherein the connecting portion is indented along a center tunnel formed on the center floor to form the installation space in a longitudinal direction of the vehicle, and wherein the drive shaft is positioned in the installation space to be disposed to penetrate between the battery built-in parts of both sides thereof.

7. The underbody of the vehicle according to claim 2, wherein the connecting portion is open downward while connecting upper portions of the battery built-in parts positioned at both sides thereof, and wherein a space open downward from the connecting portion becomes the installation space in which the drive shaft is positioned.

8. The underbody of the vehicle according to claim 2, wherein the connecting portion is open upward while connecting a lower portion of the battery built-in parts positioned at both sides thereof, and wherein a space open upward from the connecting portion becomes the installation space in which the drive shaft is positioned.

9. The underbody of the vehicle according to claim 2, further comprising:
    a traverse member coupled to a lower surface of the battery built-in part to extend in the left and right direction,
    wherein a first end of the traverse member is connected to one of the side sills of the vehicle to form a lateral load path.

10. The underbody of the vehicle according to claim 5, further comprising:
    a longitudinal member coupled to a lower surface of the battery built-in part to extend in the front and rear direction,
    wherein the front end of the longitudinal member is connected to the front cross member and the rear end of the longitudinal member is connected to the rear cross member to form a forward and backward load path.

11. The underbody of the vehicle according to claim 2, further comprising:
    a traverse member coupled to a lower surface of the battery built-in part to extend in the left and right direction; and
    a connecting portion reinforcing member indented into the connecting portion and coupled to extend along the installation space,
    wherein a first end of the traverse member is connected to one of the side sills of the vehicle and a second end of the traverse member is connected to the connecting portion reinforcing member to form a lateral load path.

12. The underbody of the vehicle according to claim 5, wherein the drive shaft is mounted to at least one of the front cross member, the rear cross member, or the high voltage battery unit.

13. The underbody of the vehicle according to claim 3, wherein a seat cross member disposed in the left and right direction above the front cross member and the center floor overlaps vertically with the center floor interposed therebetween.

14. The underbody of the vehicle according to claim 3, wherein the front cross member is connected through a flange with the center floor interposed therebetween in a state disposed at the front or the rear with respect to the seat cross member in the left and right direction above the center floor.

15. The underbody of the vehicle according to claim 2, wherein the side sills positioned at the left and right sides of the vehicle each include an upper surface, a lower surface, and a side surface, wherein left and right ends of the center floor are connected to the side surfaces of the side sills, respectively, to form an accommodating space by the lower surface of the center floor and the side surfaces of the side sills, and wherein the upper portion of the battery built-in part is accommodated in the accommodating space, and the lower portion of the battery built-in part protrudes downward from the side sills.

16. The underbody of the vehicle according to claim 5, wherein the front cross member and the rear cross member include two side parts and a connection part for connecting the two side parts, respectively, and wherein an outside end of each of the side parts is connected to one of the side sills to form a lateral load path.

17. The underbody of the vehicle according to claim 16, wherein both ends of the connection part are formed with a coupled surface to which the drive shaft is coupled, and wherein both sides of the coupled surface are formed with a bead connected with one of the side parts.

\* \* \* \* \*